United States Patent [19]

Bednarz

[11] Patent Number: 4,793,708
[45] Date of Patent: Dec. 27, 1988

[54] FIBER OPTIC SENSING COIL

[75] Inventor: Bronek Bednarz, Toronto, Canada

[73] Assignee: Litton Systems Canada Limited, Toronto, Canada

[21] Appl. No.: 30,593

[22] Filed: Mar. 27, 1987

[51] Int. Cl.⁴ ............................................. G01B 9/02
[52] U.S. Cl. ................................................... 356/350
[58] Field of Search ..................... 356/350; 242/118.7, 242/125, 118

[56] References Cited

U.S. PATENT DOCUMENTS

| | | | |
|---|---|---|---|
| 3,635,421 | 1/1972 | Boland et al. | 242/118.7 |
| 4,408,882 | 10/1983 | Sheem . | |
| 4,410,275 | 10/1983 | Shaw et al. . | |
| 4,445,649 | 5/1984 | Yataki et al. | 242/118.7 |
| 4,699,451 | 10/1987 | Mohr | 356/350 |

OTHER PUBLICATIONS

Lender, W. L.; The Orthocyclic Method of Coil Winding; 1961.
Auch et al., Fibre-Optic Gyro with Polarization--Preserving Fibre.

Primary Examiner—Davis L. Willis
Assistant Examiner—S. A. Turner
Attorney, Agent, or Firm—Elliott N. Kramsky

[57] ABSTRACT

A symmetric fiber optic sensing coil for use in a rotation sensing device such as a gyroscope. The coil comprises a plurality of turns of a continuous strand of orthogonally wound fiber optic material. The coil may comprise either dualpole or quadrupole symmetry and may be formed on a spool having at least one aperture in each of its circular flanges. The symmetric sensing coil is minimally affected by environmental factors such as temperature, vibration and magnetic fields that can otherwise produce measurements that are indistinguishable from sensed rotation.

10 Claims, 4 Drawing Sheets

FIBER OPTIC SENSING COIL

BACKGROUND

1. Field of the Invention

The invention relates to improved sensing coils for fiber optic rotation sensing devices. More particularly, this invention pertains to an improved fiber optic sensing coil and tooling therefor.

2. Description of the Prior Art

Fiber optic rotation sensing devices, such as gyroscopes, comprise two main components, (1) an interferometer (including a light source, beamsplitter, and detector) and (2) a fiber optic sensing coil, that are mounted to a rotatable platform. Light from the interferometer's light source is split by the beamsplitter into two beams, each of which is coupled into an opposed end of the sensing coil. The interferometer and associated electronics process the phase relationship between the two interfering, counter-propagating beams of light when they emerge from (opposite ends of) the coil. A phase shift difference between the two beams results from (1) coil rotation and (2) so-called "environmental" factors.

Environmental factors include such variables as temperature, vibration (both acoustical and mechanical), and magnetic fields. These factors can induce phase shifts between the counter-rotating beams which are indistinguishable from those that are induced by rotation. Environment-induced phase shifts reflect the effects of such factors upon variations in the optical light path that each beam encounters as it travels through the coil. Environmental factors are both time varying and unevenly distributed throughout the coil. As it takes a finite amount of time for a beam's wave front to pass a particular point, the effects upon the two beams are unequal, producing an undesirable (phase-shift) effect that is not later cancelled out.

In the past, particular coil winding arrangements have been utilized in attempts to minimize the effects of environmental interference factors and thereby enhance the accuracy of the sensor. Symmetric windings are arranged so that the center of the fiber forms the central turns of the coil while the ends of the fiber form its outer turns.

While the advantages of symmetric windings are recognized, this desirable arrangement has proven difficult to realize. At the present time, fiber optic sensing coils are commonly wound in a helix-type configuration. In a helix winding turns of the fiber cross the coil axis at ninety degrees plus or minus a so-called "helix angle". In the first layer of such a sensing coil, the turns are generally wound from left to right, forming a left-handed helix. The fiber of the second layer, which rests atop the first layer, runs from right to left to form a right-handed helix. Unfortunately, the reversal of the senses of the windings of adjacent layers tends to destroy the desired symmetry and regularity of the coil. The windings of a layer tend to "follow" the reverselydirected "grooves" that are formed between adjacent turns of the underlying layer. As a result, it is quite difficult to maintain the desired reversal of the senses of the windings of adjacent layers. Furthermore, as the turns of a layer alternate between lying atop and following the "grooves" of the preceding layer, the space between turns widens to an extent that turns from overlying layers begin to merge with those of preceding layers. The departure from an ideal, reversely-wound helical configuration increases as the number of overlying layers increases. At a radial distance of twelve to fourteen layers it is virtually impossible to distinguish the senses of the turns or the turns of adjacent layers. As a consequence, the desired cancellation of the effects of environmental disturbances is limited by the very configuration of the conventional, helically-wound fiber optic sensing coil.

SUMMARY OF THE INVENTION

The present invention overcomes the foregoing and other shortcomings of the prior art by providing, in a first aspect, a substantially symmetrically wound coil for a fiber optic rotation sensor. The coil comprises a continuous optical fiber of substantially round and uniform cross section comprising two fiber segments if substantially symmetrical configurations with respect to the center of the coil. The fiber is arranged into a cylindrical coil having an axis. Such coil comprises a plurality of layers of turns whereby grooves are formed by adjacent turns. Each of the turns includes a first portion oriented perpendicular to the coil axis and a second portion that is angularly disposed with respect thereto. The first portion comprises ninety to ninety-five percent of the length of each turn. Each of the layers comprise a plurality of turns wherein first and second portions are adjacent. The first portions of turns of a layer track within the grooves between the first portions of the immediately underlying layer.

In a second aspect, the invention provides tooling comprising a spool for forming a fiber optic sensor coil having a plurality of layers of orthocyclic turns. Such spool includes a cylindrical core. A pair of substantially-circular flanges are positioned at opposed ends of the core and each of the flanges includes at least one aperture extending from the core to the periphery of the flange. At least one aperture of each flange is offset from an aperture of the other flange by a predetermined amount throughout its length. The inner sides of the flanges are tapered and curved adjacent the apertures to accommodate the winding of an optical fiber.

The foregoing and additional features and advantages of this invention will become apparent from the detailed description that follows. The written portion of the description is accompanied by a set of drawing figures. Numerals indicate the various features of the invention in both the written description and the drawing figures. Like numerals refer to like features throughout both the written description and the drawings.

DETAILED DESCRIPTION

Figure 1:
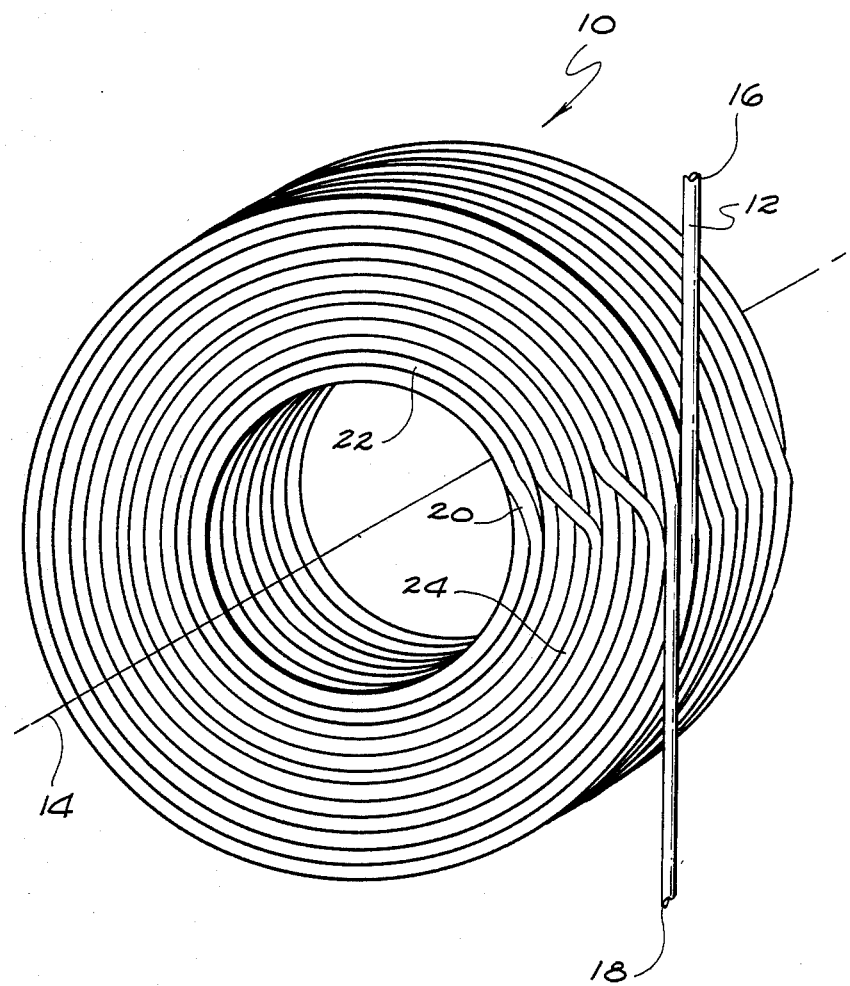
FIG. 1 is a perspective view of a fiber optic sensing coil in accordance with a first embodiment of the invention.

Turning now to the drawings, FIG. 1 is a perspective view of a sensing coil 10 of the invention for incorporation into a fiber optic gyroscope. Such a gyroscope is disclosed, for example, in U.S. Pat. No. 4,410,275 of Shaw for "Fiber Optic Rotation Sensor" issued Oct. 18, 1983. The self-supporting coil 10 is comprised of a continuous strand of optical fiber 12 (shown somewhat enlarged in diameter for clarity) that was previously formed upon a spool or like support (not shown) to comprise a plurality of concentric coil turns about a central axis 14. The coil 10 forms an optical cavity for counter-rotating beams of optical energy, each of which is coupled into one of the opposed ends 16, 18 of the single continuous coil fiber 12. An operational embodiment of a coil 10 in accordance with the present invention has been formed of a total of 1056 turns (22 layers, each of 48 turns) of average turn radius approximately 7.5 centimeters. The fiber 12 has representative dimensions of, for example, 250 microns (outer diameter), by 75 microns (cladding diameter) for use with a 0.825 micron wavelength laser. Such dimensions and quantifying numbers are given solely as representative of a known application of the invention and by no means do they represent or imply any limitation upon the scope of this invention.

The fiber that forms the coil 10 is wound symmetrically about the axis 14. As will become further apparent, the winding is accomplished in such a way that the fiber's turns are symmetrical about its center or midpoint 20 with the ends 16, 18 of the fiber 12 radiating therefrom in a symmetrical configuration of the orthogonal (quadrupole embodiment) type. To achieve an orthogonal configuration, the continuous optical fiber 12 is transferred in equal amounts according to a selected protocol, from two different supply reels to a single take-up reel or spool (discussed below) of preselected configuration so that two equal "supply" segments 22, 24 of the fiber 12 extend, in opposite directions, from its center 20. Each layer of the coil 10 comprises a plurality of turns of only one of the oppositely-directed segments 22 or 24.

The coil 10 may be either self-supporting (as shown in FIG. 1) or may remain wound about a spool when in use as an element of a sensor. In a self-supporting coil 10, the contiguous coil turns are fixed by appropriate adhesive prior to removal from a winding spool. Removal is normally accomplished by application of a thermoplastic coating to the fiber (prior to winding) followed by heating the wound coil to fuse and bond the coatings of contiguous turns.

Figure 2:
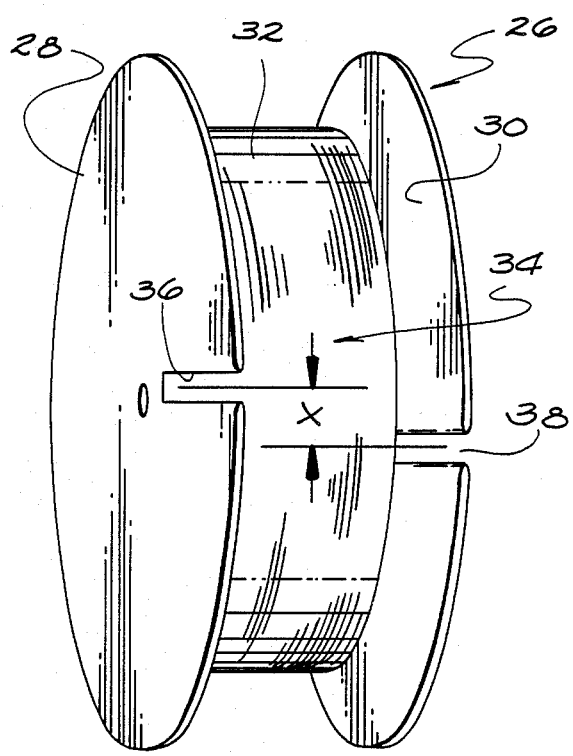
FIG. 2 is a perspective view of a spool for use in forming a coil in accordance with the embodiment of FIG. 1.

FIG. 2 is a perspective view of a support or take-up spool 26 for use in forming the sensing coil 10. The spool 26 includes a pair of generally-circular flanges 28 and 30 mounted to opposed ends of a cylindrical hollow core 32 to form boundaries for retaining turns of the optical fiber as the sensing coil 10 is wound thereon.

An orthogonally wound layer 34 of nylon fiber, of uniform diameter and roundness, may be fixed (by gluing or like means, to the surface of the core 32. The diameter of such fiber is preferably at least as great as that of the optical fiber of the coil and should not exceed it by more than three (3) per cent to assure that an identical number of turns per layer is achieved in the winding of the coil upon the spool. Alternatively, the equivalent pattern may be formed by machining, molding or the like, at the surface of the core 32. It will become apparent from the discussion that follows that such texturing of the surface of the core promotes the winding of orthogonal layers onto the spool.

The flanges 28, 30 may be either permanently or removably fixed to the core 32. In a detachable assembly, the flanges 28, 30 may be fixed by means of conventional spring-like metal fingers or the like that are arranged to engage the inner surface of the core 32. An exemplary embodiment of the spool 26 includes flanges of 15 centimeter diameters and 2.5 millimeter thickness with an outer core diameter of 14 centimeters and core thickness of 2.5 millimeters. The spool 26 is preferably of relatively high thermal conductivity and low thermal expansion coefficient material.

Elongated apertures 36 and 38 are located in flanges 28 and 30 respectively. As will be shown below, such apertures provide a means for displacing the fiber supply segments beyond the flanges during the coil winding process to prevent undesired interferences with the coil formation process. The apertures 36, 38 extend from the surface of the core 32 to the flange's outer edges and are laterally displaced by a distance x. The significance of the relative displacements of the apertures 36, 38 will become apparent below. The apertures are not radial but rather separated by x throughout their lengths so that the size of a crossover region (discussed below) remains constant throughout the coil.

Figure 3:
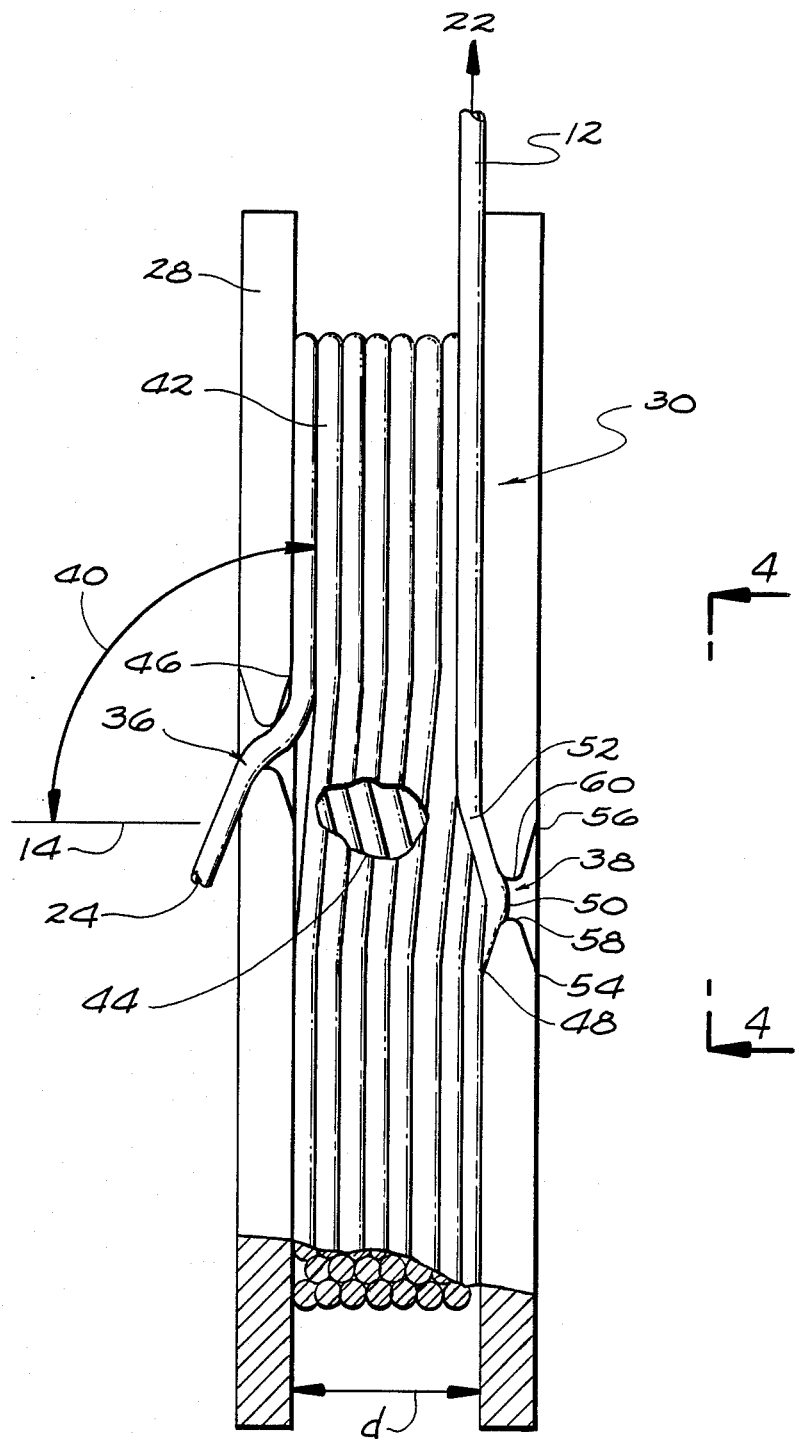
FIG. 3 is a partially broken front elevation view of a fiber optic sensing coil in accordance with the invention as it is wound up on a spool.

FIG. 3 is an partial broken front elevation view of a fiber optic sensing coil 10 wound upon a spool as illustrated in FIG. 2. As indicated in this view, fiber of the supply segment 24 is displaced outside the flange 28 through the aperture 36. Fiber from supply segment 22, having "climbed" or risen from a preceding layer is wound orthogonally into the first turn of the next coil layer. For purposes of illustration, the fiber material 12 is shown in exaggerated proportion with respect to flange thickness, the ratio of flange thickness to fiber diameter in an actual embodiment being approximately 10 to 1.

In an orthogonally wound coil, unlike a helical coil, the greater portion of each coil turn is oriented substantially perpendicular to the coil axis. Thus a right angle 40 exists between the major portion 42 of each turn forming a layer and the coil axis 14. This alignment utilizes the grooves formed between adjacent turns (or an end turn and the adjacent flange) of adjacent coil layers to secure or anchor a substantial percentage of the length of each turn. Such grooves provide interlocking channels for guiding the turns of overlying layers. Such an interlocking effect can be seen quite clearly at the lower sectional portion of the coil of FIG. 3. The substantially round fibers of adjacent layers are seen to fit neatly into the grooves that exist between the round fibers of the preceding layer.

The number of turns of the optical fiber (per layer) determines the distance d between the opposed interior surfaces of the flanges 28 and 30. The distance d is calculated as:

$$d = (n + \tfrac{1}{2}) \cdot d_{Fiber}$$

where
n = number of turns per layer $d_{Fiber}$ = diameter of optical fiber.

As discussed above, the greater portion of each coil turn is orthogonal to the coil axis 14. A "cross-over" region of turn segments that are angularly-inclined with respect to the major orthogonal turn segments is formed in each layer. The angularly-inclined segments (each of which comprises between five to ten per cent of a coil turn depending on coil diameter) of overlying coil layers do not interlock as do the orthogonal turn segments. Rather, the design of the coil is effectively "anchored" throughout ninety (90) to ninety-five (95) percent of the windings so that both the beginning and the end of each angularly-inclined turn section is reliably secured. As a result, inconsistencies (in terms of angular orientations) between the crossover regions of overlying coil layers do not degrade the structure.

As shown at 44, a cutaway section for exposing a portion of the cross-over region of the underlying fiber layer, the fibers of this region are oppositely directed. As mentioned above, such a reversal can be sustained in Applicant's coil unlike a helically-wound coil wherein an anchoring orthogonal turn section is not provided.

In forming a quadrupole coil by utilizing the tooling of the spool 26 of FIG. 2, a cross-over region of the fiber layer is formed between taper point 46 and taper point 48 of the interior surfaces of the flanges 28 and 30 respectively that define the beginnings of tapers in the flanges towards the apertures 36 an 38. The tapers and the apertures provide room for the fiber to "climb" up and around the end turns of preceding layers without disturbing the layer. A bend 50 of the fiber occurs as the fiber of a supply segment climbs from the underlying layer formed from that supply segment. The geometry of the flange 30 is arranged so that its interior surfaces begin to taper at 48, 52 while the exterior surfaces of the flange 30 begin to taper at 54, 56 toward the rounded apexes 58, 60 that define the sides of the aperture 38. A like arrangement is provided with respect to the region of the aperture 36 of the flange 28. The exterior tapers of the flanges provide a measure of protection when the supply segments are displaced outside or within an aperture preventing undesirable "pinching" of the optical fiber. The rounded apexes provide further protection against damage to the fiber during the winding of the coil.

Figure 4:
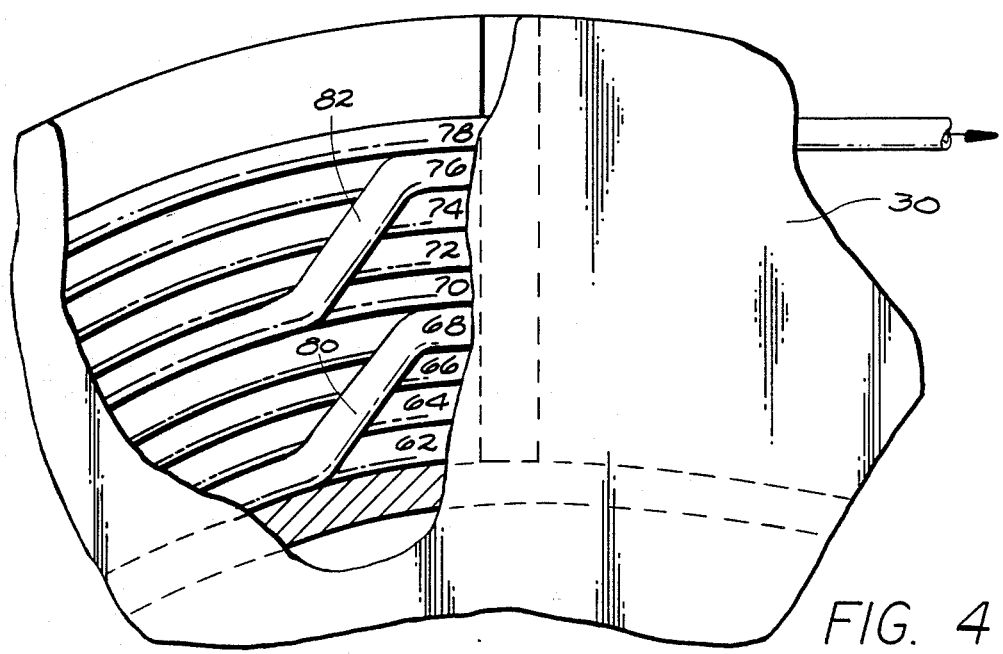
FIG. 4 is a greatly enlarged, broken view taken along the section line 4—4 of the coil and spool of FIG. 3 that illustrates the so-called "climbing" of the fiber of an orthogonally-wound fiber optic sensing coil of the quadrupole type.

The climbing or ascent of a supply segment from layer to layer is shown in FIG. 4, a partially broken side elevation view taken at 4—4 of FIG. 3. In this view "end" turns (each from a different coil layer) adjacent the flange 30 are numbered sequentially from 62 to 78. In practice, of course, a wide range of numbers of layers may be employed. The order of the supply segments, and the resultant climbing sequence is determined by the specific type (quadrupole, dualpole or variations thereof) of orthogonal coil configuration employed. FIG. 4 relates to a coil of quadrupole symmetry wherein the end turns 62, 68, 70, 76, and 78 (i.e. every fourth layer, beginning with the layer adjacent the core of the spool) are wound from one supply segment while the layers of the turns 64, 66, 72, and 74 are wound from the other supply segment. The inclined section 80 of fiber of the first supply segment climbs around the edge turns (and layers aligned therewith) to reach and thereby initiate the formation of an overlying layer indicated by the end turn 68. Similarly, an inclined section 82 begins with the end turn 70 that is shown to lie atop the layer 68 and climbs above the two layers of end turns 72 and 74 to begin the end turn 76 that initiates the corresponding overlying layer. The identical climbing process occurs at the opposed edge or "cheek" of the coil. The two sequences are staggered as a result of the occurrence of an initial one-layer step from the innermost layer to an overlying layer. Thereafter, the climbing or winding proceeds by the illustrated "jumping" of two overlying layers. Thus at the opposed cheek, the second supply segment climbs from layer 62 to layer 64, then from layer 66 to layer 72, etc.

Figure 5:
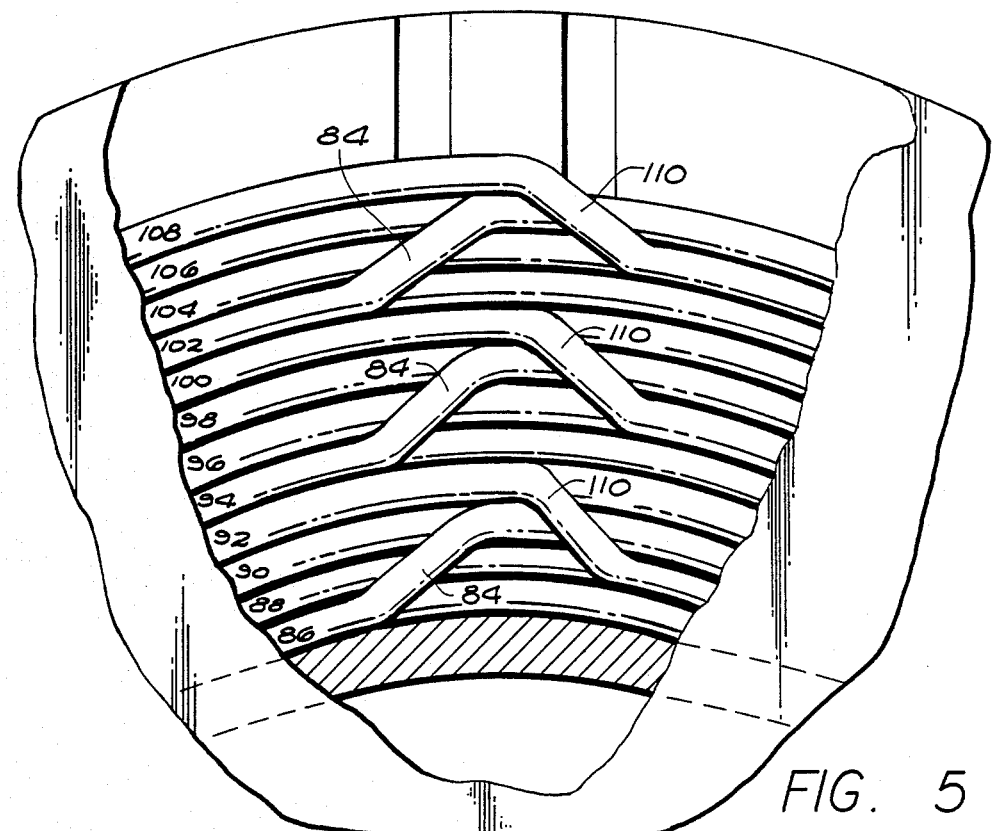
FIG. 5 is a partial side view, corresponding generally to that of FIG. 4, that illustrates the contrasting mode of fiber climbing in an orthogonally-wound sensing coil of the dualpole type.

FIG. 5 corresponds generally to the preceding figure for illustrating an orthogonally wound optical fiber having alternative dualpole symmetry. In such a symmetry each adjacent layer is wound from a different supply segment alternating with every layer rather than with every other layer as in the coil of the quadrupole symmetry described above. As will be shown below, this variation of the winding process is enhanced by a spool design that differs from the spool utilized for forming a quadrupole wound coil.

As each layer climbs, inclined segments, originating with each supply segment, extend from each end turn at each of the opposed cheeks of the coil. Thus inclined segments 84 from the first supply climb from layers 86 to 90, 94 to 98, and 102 to 106 respectively while the oppositely inclined fiber segments 110 of the second supply climb from layers 88 to 92, 96 to 100 and 104 to 108 respectively. The turns of both quadrupole and dualpole wound coils are characterized by substantially larger orthogonal portions than the angular portions that comprise the cross-over regions of each layer. As a result in each of such embodiments, the major portion of each turn interlocks with those of underlying layers so that the beginnings and ends of crossover region segments are secured and their preferred orientations preserved. Thus, both embodiments avoid the harmful distortion of turns that occurs in the formation of a helically wound coil.

Figure 6:
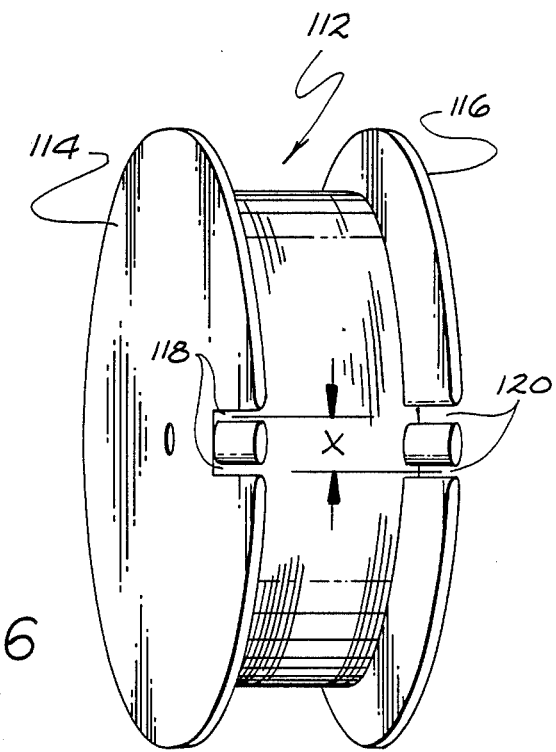
FIG. 6 is a perspective view of a spool for use in forming a sensing coil in accordance with the embodiment of FIG. 5.

FIG. 6 is a perspective view of a spool 112 adapted for use in forming a dualpole wound coil. As in the spool 26 of FIG. 2, flanges 114, 116 include elongated apertures separated by an identical distance x for permitting and assisting the above described fiber climbing process. However, a pair of apertures 118, 120 are formed in each of the flanges 114, 116 rather than a single opening. The additional aperture is provided to prevent interference between the oppositely-directed supplies during the winding process. Further, by providing a pair of apertures in each flange the positions of the oppositely-inclined "climbing" portions of turns are separated preventing undesirable crossing of the inclined segments 84 and 110 of FIG. 5.

Thus it is seen that there has been brought to the art an improved fiber optic sensing coil and tooling for use in fabricating such a coil. By utilizing the teachings of the invention, one may measure rotation with greater accuracy as the effects of environmental factors are minimized.

While this invention has been described in its preferred embodiments, its scope is not limited thereto. Rather it is only limited insofar as defined in the following set of claims and such scope includes all equivalents thereof.

What is claimed is:

1. A substantially symmetrically wound coil for a fiber optic rotation sensor comprising, in combination:
   (a) a continuous optical fiber of substantially round and uniform cross section comprising two fiber segments, said segments being of substantially symmetrical configurations with respect to the center of said coil;

(b) said fiber being arranged into a cylindrical coil having an axis, said coil comprising a plurality of layers of turns of said fiber whereby grooves are formed between adjacent turns;

(c) each of said turns including a first portion oriented perpendicular to the axis of said coil and a second portion angularly disposed with respect thereto, said first portion comprising ninety to ninety-five percent of the length of each turn;

(d) each of said layers comprising a plurality of turns, said first and said second portions of said turns being adjacent; and (e) the first portions of turns of a layer tracking within the grooves between the first portions of the turns of the immediately underlying layer.

2. A coil as defined in claim 1 wherein said fiber additionally includes a plurality of inclined portions for interconnecting coil layers.

3. A coil as defined in claim 2 wherein said inclined portions comprise second portions of turns located at the edges of layers.

4. A coil as defined in claim 3 wherein two adjacent layers are formed from a segment of said optical fiber.

5. A coil as defined in claim 4 wherein adjacent layers are formed from different segments of said optical fiber.

6. A spool for forming a fiber optic sensor coil having a plurality of layers of orthocyclic turns comprising, in combination;

(a) a cylindrical core;

(b) a pair of substantially-circular flanges positioned at opposed ends of said core;

(c) each of said flanges having at least one aperture extending from said core to the periphery, at least one aperture of each flange being offset from an aperture of the other flange by a predetermined amount throughout its length;

(d) the inner sides of said flanges being tapered and curved adjacent said apertures for accommodating the winding of an optical fiber.

7. A spool as defined in claim 6 wherein a single layer of orthocyclically wound optical fiber is fixed to the surface of said core.

8. A spool as defined in claim 6 wherein an orthocyclic winding pattern is formed in the surface of said core.

9. A spool as defined in claim 6 including:

(a) two apertures are located in each of said flanges; and (b) said apertures of each of said flanges are in parallel alignment throughout their lengths.

10. A spool as defined in claim 6 wherein said apertures further include:

(a) rounded exterior edges; and, (b) said flanges taper to said rounded exterior edges.

* * * * *